United States Patent [19]

Downs

[11] Patent Number: 5,186,065
[45] Date of Patent: Feb. 16, 1993

[54] MULTI-RATIO POWER TRANSMISSION

[75] Inventor: Robert C. Downs, Clarkston, Mich.

[73] Assignee: Saturn Corporation, Troy, Mich.

[21] Appl. No.: 812,291

[22] Filed: Dec. 23, 1991

[51] Int. Cl.$^5$ ............................................. F16H 3/08
[52] U.S. Cl. ................................ 74/331; 74/665 GA; 74/413
[58] Field of Search .............. 74/665 B, 665 GA, 331, 74/392, 401, 413

[56] References Cited

U.S. PATENT DOCUMENTS

| | | | |
|---|---|---|---|
| 4,159,654 | 7/1979 | Hattori | 74/331 |
| 4,566,348 | 1/1986 | Akashi et al. | 74/331 X |
| 4,570,503 | 2/1986 | Theobald | 74/331 X |
| 4,576,063 | 3/1986 | Akashi et al. | 74/745 |
| 4,718,295 | 1/1988 | Jesena | 74/331 X |
| 4,750,580 | 6/1988 | Umemoto | 74/665 GA X |
| 4,799,399 | 1/1989 | Bruce | 74/331 X |
| 5,031,473 | 7/1991 | Yumato | 74/331 X |

FOREIGN PATENT DOCUMENTS

| | | | |
|---|---|---|---|
| 2065300 | 4/1973 | Fed. Rep. of Germany | 74/331 |
| 54-3732 | 12/1979 | Japan | 74/665 GA |
| 1-206138A | 8/1989 | Japan | |

*Primary Examiner*—Leslie A. Braun
*Assistant Examiner*—Ryan W. Massey
*Attorney, Agent, or Firm*—Donald F. Scherer

[57] ABSTRACT

A power transmission has an input shaft, an output shaft and a transfer or secondary input shaft disposed on parallel noncoaxial axes. A transfer gear train including a gear member supported on each axis is connectible to the input shaft through a forward friction clutch for drivingly connecting the input shaft and the transfer shaft through a one-way drive connection to the output shaft. The transfer gear train provides the first and lowest forward drive ratio between the input and output shafts through the one-way drive connection. A plurality of friction clutches on the input and transfer shafts and associated reaction gears on the shafts are selectively operable to provide a plurality of higher forward ratios during which the one-way device permits the output shaft to overcome the transfer gear mounted thereon.

2 Claims, 2 Drawing Sheets

MULTI-RATIO POWER TRANSMISSION

BACKGROUND OF THE INVENTION

This invention relates to multi-ratio power transmissions, and more particularly, to such transmissions having a secondary input countershaft for transmitting some of the ratios between the input shaft and the output shaft.

In one prior art transmission structure, gearing dedicated to transferring rotation from the input shaft to the countershaft or secondary input shaft by way of the output shaft incorporates an idler gear member rotatably supported on the output shaft. The transfer gearing mechanism thus constructed utilizes axial space to accomplish the transfer function. The axial space utilized can be more gainfully employed.

In another prior art transmission structure, the idler gear is selectively connectible with the output shaft through a selectively operated friction clutch which also requires additional axial space. This arrangement requires the friction clutch to have an open running condition which reduces the efficiency during operation in the other gear ratios. The space utilized by the friction clutch can be more gainfully employed as will be apparent from the following description of the structure disclosed herein.

SUMMARY OF THE INVENTION

The present invention provides for an efficient utilization of the axial space occupied by the transfer gearing of a countershaft type transmission. In the transfer gearing employed with the present invention, a one-way drive mechanism is utilized to provide a drive connection between the input shaft and the output shaft during the lowest forward ratio of the transmission.

The space taken by the transfer gear mechanism also provides the envelope in which at least one other gear ratio gear member is disposed. The use of the one-way mechanism on the output shaft permits an increased number of fluid operated friction clutches to be disposed in axial alignment on the input shaft and the countershaft. Thus, in the space employed in the prior art, the present invention can provide three forward drive ratios while the prior art was only able to accomplish one or two forward ratios.

It is an object of the present invention to provide an improved multi-ratio power transmission, wherein the input shaft is selectively rotatably connected with a transfer shaft through an idler gear on the output shaft, and wherein the idler gear is drivingly connectible with the output shaft by way of a one-way clutch during the lowest forward ratios.

It is another object of this invention to provide an improved multi-ratio transmission having an input shaft, an output shaft, and a secondary input shaft disposed in parallel noncoaxial relation, wherein transfer gearing is operable in combination with a selectively engageable clutch and idler gear on the shaft to transfer rotation from the input shaft to the output shaft during the lowest forward gear ratio, and also wherein a plurality of forward ratio clutches are disposed in axially aligned pairs on the input shaft and the secondary input shaft for providing in combination with a plurality of ratio gears selective torque paths between the input shaft and the output shaft.

It is yet another object of this invention to provide an improved multi-ratio power transmission having at least five forward ratios and including transfer gearing between an input shaft and a countershaft through a transfer gear mounted on a one-way device on the output shaft, whereby minimum axial length is utilized.

It is a further object of this invention to provide an improved multi-ratio power transmission as set forth above, wherein a forward clutch, a portion of the transfer gearing and the one-way device cooperate to provide the lowest forward ratio.

These and other objects and advantages of the present invention will be more apparent from the following specification and drawings.

DESCRIPTION OF THE EXEMPLARY EMBODIMENTS

Figure 1:
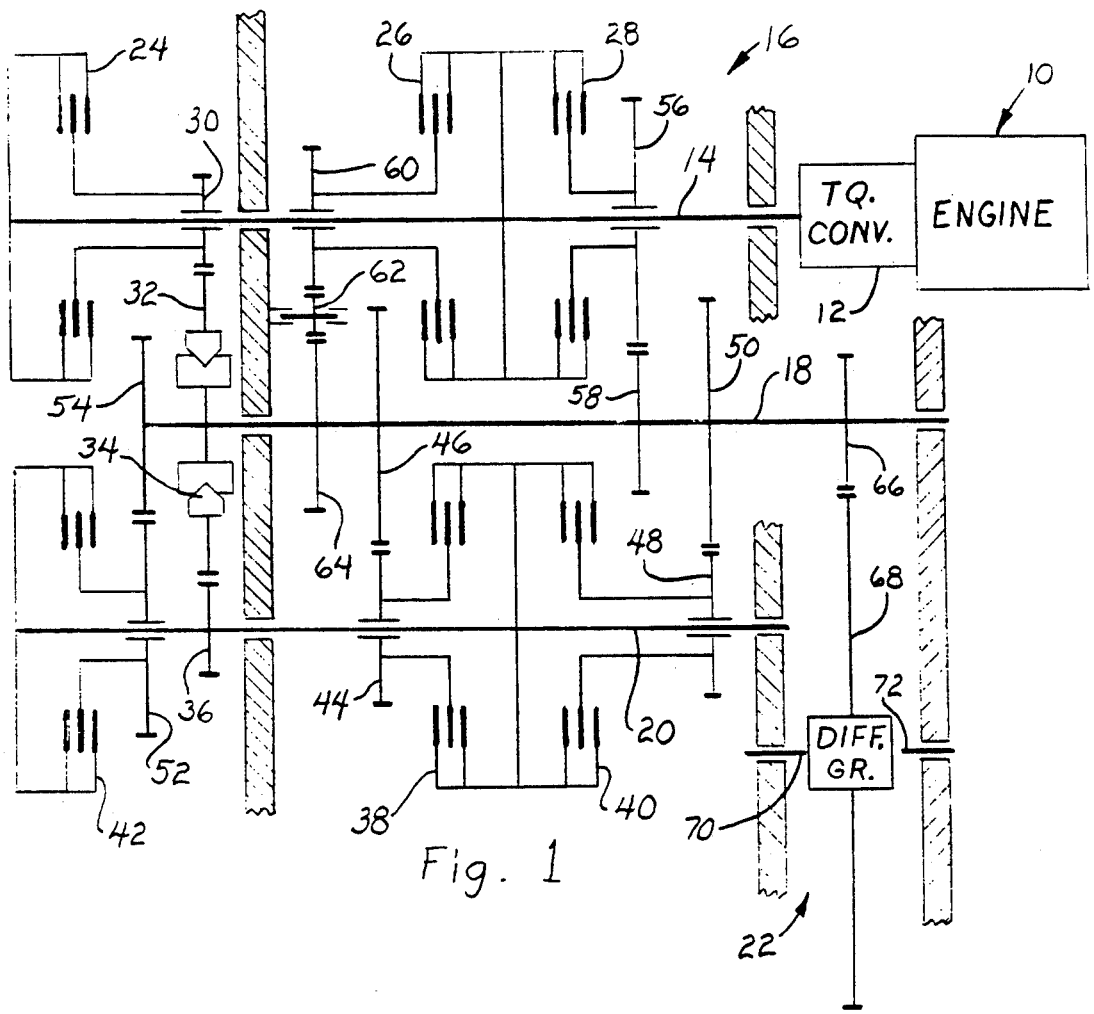
FIG. 1 is a schematic representation of a power transmission incorporating the present invention.

There is seen in FIG. 1 a schematic representation of a vehicle powertrain having a conventional engine 10 and a torque converter 12 disposed to drive an input shaft 14 for a power transmission generally designated 16. The power transmission 16 also incorporates an output shaft 18, a secondary input shaft or countershaft 20 and a conventional output differential gear arrangement, generally designated 22. The input shaft 14 has rotatably mounted thereon a plurality of conventional selectively engageable friction clutches 24, 26 and 28.

The friction clutch 24 is a forward clutch which is engaged for all forward gear operations and has drivingly connected therewith an input and transfer gear 30. The gear 30 is disposed in constant mesh with a transfer gear 32 which is operatively connectible with the output shaft 18 through a conventional one-way clutch mechanism 34. The transfer gear 32 is also disposed in constant mesh with a secondary input and transfer gear 36 which is secured for continuous rotation with the countershaft 20.

The countershaft 20 has operatively connected therewith a plurality of selectively engageable fluid operated friction clutches 38, 40 and 42. The friction clutch 38 is drivingly connected to a ratio gear 44 which is disposed in constant mesh with a ratio gear 46 which is continuously drivingly connected with the output shaft 18. The friction clutch 40 is operatively connectible with a ratio gear 48 which is disposed in continuous meshing relationship with the ratio gear 50 which is also drivingly connected to the output shaft 18. The clutch 42 is operatively connectible with a ratio gear 52 which in turn is in mesh with the ratio gear 54 which is secured for rotation with the output shaft 18.

The friction clutch 28 is operatively connectible with the ratio gear 56 which is disposed in mesh with the ratio gear 58 which is secured to the output shaft 18 for rotation therewith. The friction clutch 26 is operatively connectible with a reverse input gear 60 which is disposed in mesh with a reverse idler gear 62 which is disposed in mesh with a reverse output gear 64. The reverse output gear 64 is secured for rotation with the output shaft 18.

The output shaft 18 also has an output gear 66 secured thereto which is disposed in meshing relationship with a differential input gear 68. The differential input gear 68 provides an input member for the differential gear arrangement 22 which is operable to drive a pair of output drive shafts 70 and 72.

The friction clutch 24 is engaged for all forward drive ratios within the transmission. When the friction clutch 24 is engaged, the gear 30 is operable to provide rotation of the input shaft 14 to the transfer gear 32. If the remaining clutches within the transmission are disengaged, the rotation of the gear 32 is transmitted by way of the one-way clutch 34 to the output shaft 18 which, as described above, will provide rotation for the differential 22. This is the drive path or torque transmission path for the lowest ratio drive of the transmissions.

To establish the second forward ratio, the selectively engageable friction clutch 38 is operated, which is effective to provide a drive connection between the secondary input shaft 20 and the ratio gear 44. The secondary input shaft 20 is continuously rotated whenever the forward clutch 24 is engaged through the intermeshing relation of the transfer gears 30, 32 and 36.

In the preferred embodiment of this invention, the gears 30 and 36 have the same number of teeth and therefore the input shaft 14 and secondary input shaft 20 will rotate at the same speed. Thus, the ratio gear 44 is rotated by the engine power whenever the clutch 38 is engaged. The ratio gear 44, through its meshing relation with gear 46, will cause rotation of the output shaft 18. The gears 44 and 46 are sized such that the output shaft 18 will be rotated in the forward direction at a higher speed than that provided by the gears 30 and 32. The one-way clutch 34 will permit the output shaft 18 to overrun the one-way clutch 34 whereby the transfer gears 30, 32 and 36 will continue to provide the torque transfer function, however, the gear 32 will be effectively disengaged from the output shaft 18.

A third forward gear ratio is established by engaging the friction clutch 40, while the friction clutch 38 is disengaged. The clutch 40 provides a drive connection between the secondary input shaft 20 and the output shaft 18 by way of ratio gears 48 and 50. This combination of gearing will provide a higher output speed than was available from the ratio gears 44 and 46 and a given input speed. The one-way clutch 34 will continue to permit the output shaft 18 to overrun the transfer gear 32.

A fourth forward gear ratio is established by the engagement of friction clutch 42 and the disengagement of friction clutch 40. The engagement of clutch 42 establishes a drive path between the input shaft 14 and the output shaft 18 via the transfer gearing 30, 32 and 36 and the ratio gears 50, 52 and 54. The ratio gears 52 and 54 will provide a higher output speed at shaft 18 for a given input speed at shaft 14 than was provided in the first through third ratios.

To establish a fifth forward speed ratio, the friction clutch 28 is engaged while the friction clutch 42 is disengaged. The engagement of friction clutch 28 establishes a torque path between the input shaft 14 and output shaft 18 through the ratio gears 56 and 58. For a given input speed at shaft 14, the fifth ratio will provide a higher output speed at shaft 18 than is available in ratios one through four.

To establish the reverse drive ratio between the input shaft 14 and the output shaft 18, clutch 26 is engaged while all the remaining clutches are disengaged. The reverse drive path is provided between the input shaft 14 and the output shaft 18 through the reverse input gear 60, the idler gear 62 and the reverse output gear 64. The use of the idler gear 62 provides for reversing the rotation of the torque between the input shaft 14 and the output shaft 18.

Figure 2:
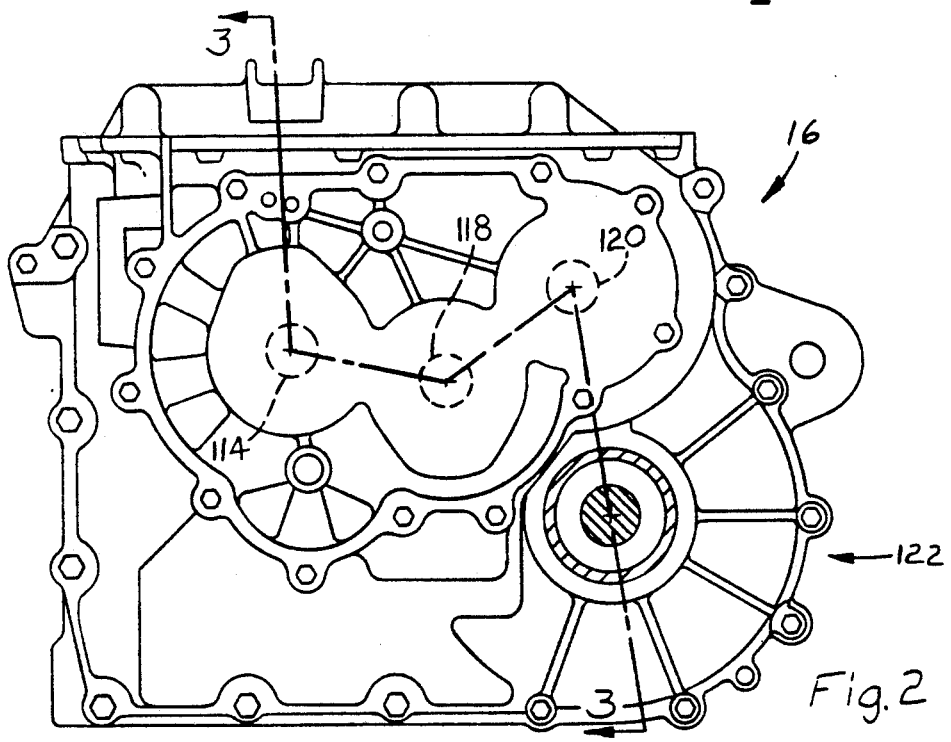
FIG. 2 is an end view of a transmission incorporating the present invention and describing the position of the various shaft elements within the transmission.

FIG. 2 depicts an end view of the transmission showing the center locations of the input shaft 114 the output shaft 118 secondary input shaft 120 and the center of the differential 122. This view describes the cross-sectional area which will be taken up by a transmission incorporating the present invention.

Figure 3:
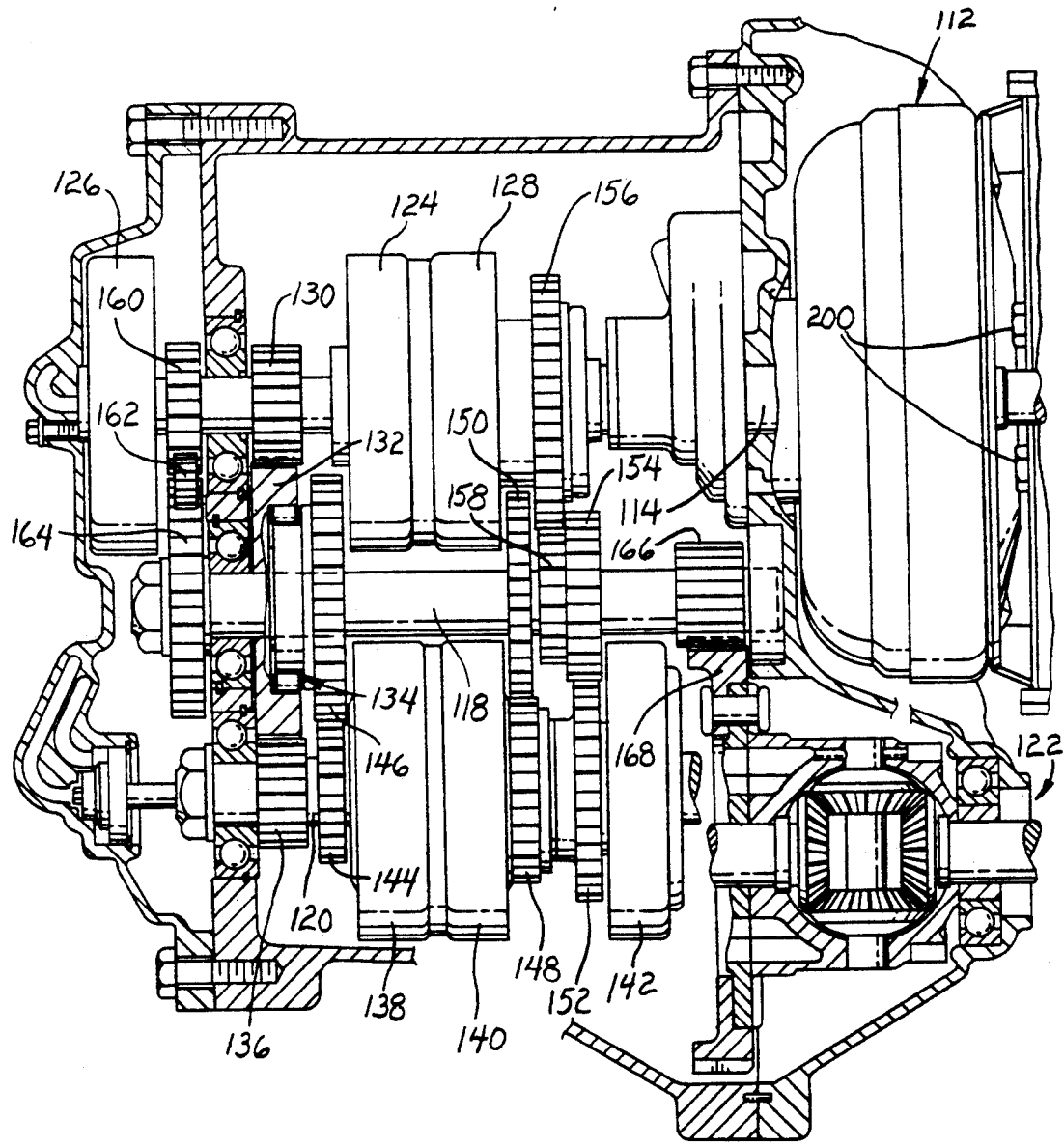
FIG. 3 is a view taken along line 3—3 of FIG. 2 depicting an alternate embodiment of a transmission incorporating the present invention.

However, the more important dimension taken by the transmission is the axial length. An exemplary embodiment, as seen in FIG. 3, is designed for use in a transversely mounted front wheel drive power package, wherein the engine and transmission are mounted transversely to the longitudinal axis of the vehicle. Thus, axial length is limited by tread width of the vehicle.

As seen in FIG. 3, a conventional torque converter and torque converter clutch assembly 112 is positioned to be attached by threaded fasteners 200 to an engine, not shown. The elements of the transmission shown in FIG. 3, where possible, will have the same numerical designation as their counterparts in FIG. 1, with the exception that the numeral 100 will be added to the numerical designation.

The torque converter 112 is operative to rotate the input shaft 114, which in turn rotates the forward clutch 124, the fifth ratio clutch 128 and the reverse clutch 126. The output shaft 118 is drivingly connected to the differential 122 through the output gear train 166, 168. The secondary input shaft 120 is continuously drivingly connected with the forward clutch 124 through the transfer gear train 130, 132 and 136. Thus, as described above for FIG. 1, the shaft 120 is rotated at the same speed as the input shaft 114 whenever the clutch 124 is engaged.

To accommodate the real estate available in a specific powertrain envelope for use in a vehicle, the fourth clutch 142 has been relocated near the differential end of the transmission, and the forward clutch 124 and reverse clutch 126 have been interchanged in position The second ratio clutch 138 and third ratio clutch 140 are disposed along the shaft 120 at a position where they are axially aligned with the forward clutch 124 and fifth clutch 128, respectively.

There is another advantage to the embodiment shown in FIG. 3. The first and lowest ratio, as described above, is provided when the clutch 124 is engaged and all the remaining clutches are disengaged. During this condition, the input power at shaft 114 is directed via clutch 124, gears 130 and 132 and one-way clutch 134 to the output shaft 118. The second forward ratio is established by the engagement of friction clutch 138, such that the input power is directed from the input shaft 114 through gears 130, 132 and 136, and then through clutch 138 and gears 144 and 146 to the output shaft 118.

The second ratio gear 146 is also the inner race for the one-way clutch 134. This provides improved axial space use by axially locating the forward ratio clutch with another forward ratio clutch, such as in this case, the second gear ratio clutch.

The remaining forward ratios are established in the same manner as described above for FIG. 1, as will be readily apparent to those skilled in the art. Therefore, it is considered, that only a brief description of these power paths is required.

To establish the third forward ratio, the friction clutch 140 is engaged while the friction clutch 138 is disengaged, thus establishing the power path from the input shaft 114 to the output shaft 118 through clutch 124, transfer gears 130, 132 and 136, clutch 140 and ratio gears 148 and 150.

The fourth forward ratio is established by engagement of the friction clutch 142 and the disengagement of the friction clutch 140. In fourth gear, the power flow path from input shaft 114 to output shaft 118 is through the clutch 124, transfer gears 130, 132 and 136, the fourth ratio clutch 142 and the fourth ratio gears 152 and 154.

To establish the fifth forward ratio, the fifth ratio clutch 128 is engaged, while the fourth ratio clutch 142 is disengaged. In the fifth forward ratio, the power flow path from the input shaft 114 to the output shaft 118 is through the fifth ratio clutch 128 and the fifth ratio gears 156 and 158. If desirable during fifth gear, the forward clutch 124 can be disengaged since this clutch does not enter or take part in the power transfer.

The reverse ratio between the input shaft 114 and the output shaft 118 is established by the engagement of reverse clutch 126 and the disengagement of all of the remaining clutches. During the reverse ratio, the power flow path from the input shaft 114 to the output shaft 118 is through the reverse clutch 126, reverse input gear 160, reverse idler gear 162 and the reverse output gear 164.

The above descriptions of FIGS. 1 and 3 provide alternative axial layouts of two embodiments of the present invention. It should be noted in both embodiments that the central portion of the transmission accommodates for friction clutches assembled back-to-back on the input shafts 14 and 114 and the secondary input shafts 20 and 120.

In FIG. 1, the reverse clutch 26 and the second ratio clutch 38 are in axial alignment and the fifth clutch 28 and the third clutch 40 are in axial alignment. In FIG. 3, the forward clutch 124 has been swapped in position with the reverse clutch 126 and is therefore, as described above, axially aligned with the second clutch 138. Those skilled in the art will recognize that by replacing a selectively engageable friction clutch in the transfer gearing with a pair of friction clutches on the input and secondary input shaft and a one-way clutch in the transfer gear structure, a considerable axial spacing has been gained.

By replacing the transfer gearing of the prior art with the one-way drive mechanism of the present invention, an additional forward ratio is obtained in the same axial space envelope. Thus, the present invention provides unique advantages of the known prior art arrangements.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A power transmission comprising: an input shaft rotatably mounted on a first axis; an output shaft rotatably mounted on a second axis; a countershaft rotatably mounted on a third axis; transfer gear means including a first gear means rotatably mounted coaxial with said input shaft, second gear means continuously rotatable with said countershaft and third gear means including a gear member meshing with said first and second gear means and being selectively drivingly connectable with said output shaft through a one way drive means; first clutch means for selectively connecting said first gear means with said input shaft for establishing a one way drive relation between said input shaft and said output shaft at a first predetermined ratio via said one way drive means and said first and third gear means; second ratio gear and clutch means for establishing a second predetermined ratio between said input shaft and said output shaft via said first clutch means, said first, second and third gear means and said second ratio gear and clutch means, and said one way means being in an overrunning relation between said third gear means and said output shaft during said second predetermined ratio.

2. The power transmission defined in claim 1, wherein said second ratio gear and clutch means comprises; a fourth gear means having a hub portion defining an inner race for said one-way drive means, a fifth gear means rotatably mounted on said countershaft and meshing with the fourth gear means and selectively engageable clutch means operatively connected with the countershaft for selectively connecting the fifth gear means with the countershaft whereby said second predetermined ratio is established.

* * * * *